No. 12,443. REISSUED JAN. 30, 1906.

E. C. SCHMERTZ, DEC'D.

R. LONGENECKER, ADMINISTRATOR.

APPARATUS AND PROCESS FOR MANUFACTURING WIRE GLASS.

APPLICATION FILED JAN. 6, 1906.

Fig. 1.

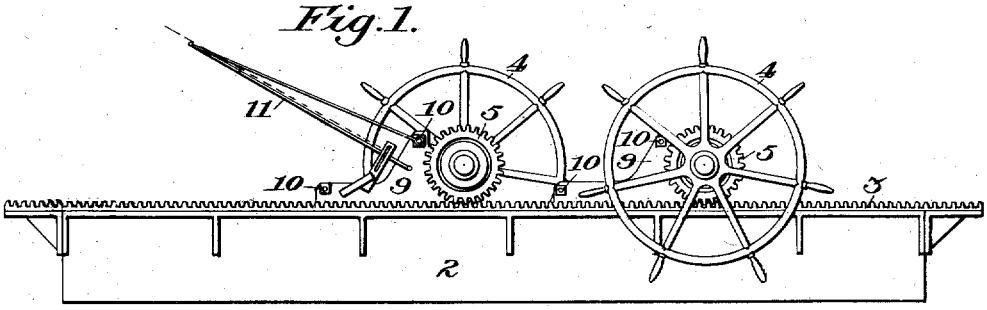

Fig. 2.

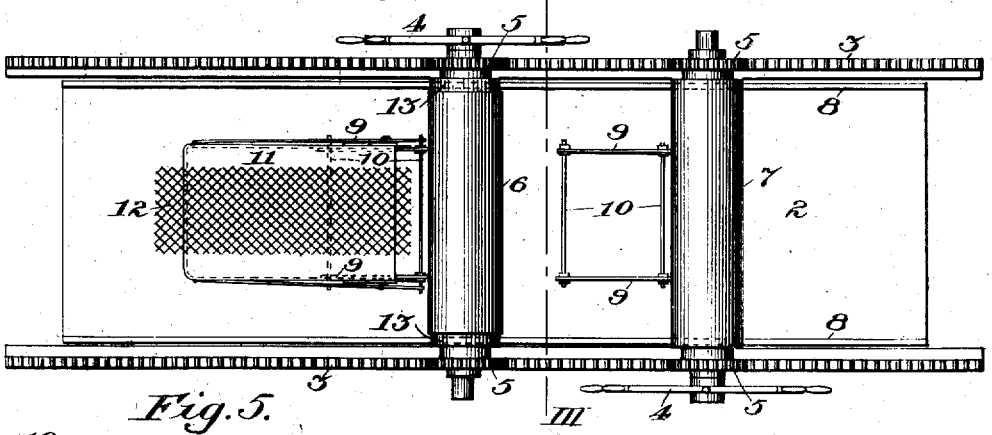

Fig. 5.

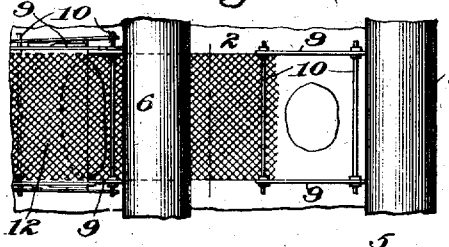

Fig. 4.

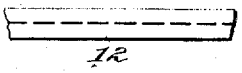

Fig. 3.

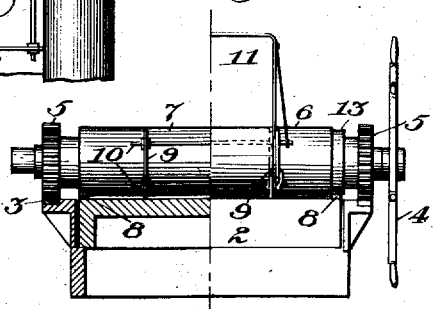

Fig. 6.

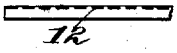

Witnesses:

Geo. E. Gantt

Alex. Scott

The Schmertz Wire Glass Company, assignee by mesne assignments of Edmund C. Schmertz, dec'd, inventor.

Ralph Longenecker, administrator of the Estate of Edmund C. Schmertz, deceased, by W. B. Corwin, associate attorney.

UNITED STATES PATENT OFFICE.

THE SCHMERTZ WIRE GLASS COMPANY, OF NEW YORK, N. Y., ASSIGNEE, BY MESNE ASSIGNMENTS, OF RALPH LONGENECKER, ADMINISTRATOR OF EDMUND C. SCHMERTZ, DECEASED.

APPARATUS AND PROCESS FOR MANUFACTURING WIRE-GLASS.

No. 12,443. Specification of Reissued Letters Patent. Reissued Jan. 30, 1906.

Original No. 791,216, dated May 30, 1905. Application for reissue filed January 6, 1906. Serial No. 294,812.

*To all whom it may concern:*

Be it known that EDMUND C. SCHMERTZ, deceased, late a citizen of the United States, and a resident of Pittsburg, in the county of Allegheny and State of Pennsylvania, did invent or discover a new and useful Apparatus and Process for Manufacturing Wire-Glass, of which the following is a specification.

In the accompanying drawings, which make part of this specification, Figure 1 is a side elevation of the apparatus employed. Fig. 2 is a plan of same. Fig. 3 is a combined elevation of the left-hand end and a section on line 111 111 of Fig. 2. Fig. 4 is a broken edge view of a piece of wire-glass. Fig. 5 is a broken plan showing the relative situation of the wire and glass just before the second casting is rolled upon the sheet, and Fig. 6 a broken edge view of glass at same stage.

The purposes of the invention, generally stated, are to devise a certain combination of apparatus and such changes in the process of manufacturing wire-glass as will produce a glass with brilliant top surface instead of rough and dull, also to prevent the glass becoming over-chilled in making, so that it will not be excessively hard.

Wire-glass as it is now actually manufactured in this country is made in the following manner: the glass is poured upon the usual casting-bed and a roller pulled over the same, developing a sheet of glass of substantially the thickness of the final product. Back of this roller, which is sometimes termed the "smoothing-roller," wire-gauze is fed upon the top of the sheet thus formed from a chute or other suitable device. A second corrugated roller now passes over the wire-gauze and the sheet of glass and by its ribs deeply indents the wire-gauze in the body of the sheet. A third smooth-finishing roller now travels over the sheet thus corrugated and gives a finish to the top of the sheet. Some of the objections to this method are these: The action of the three rollers chills the top surface of the glass excessively before it can be transferred to the annealing-kiln. The result is that the glass becomes unduly hard and is difficult to cut. It is a serious task to cut wire-glass when made under the best conditions, and this extra hardening aggravates the situation; but another and more important objection to the method just described lies in the rough top surface produced. The first or leading roll gives a smooth finish to the top of the glass; but this is immediately ruined by the passage of the corrugated roll in the operation of forcing the wire down into the body of the sheet. This smooth finish is never regained, for although the third roller will efficiently smooth down any elevations on the surface of the glass it will not perfectly transfer the surplus glass to the depressions and fill them up with a perfect weld. An examination, therefore, of glass made by this process will disclose fine channels running across the surface which has been uppermost in the process. These channels roughen the surface, making it appear dull and lusterless, and greatly impair its appearance. The unevenness of the surface again adds to the trouble in cutting the article, as the diamond will not traverse it with the same ease as a polished surface.

The present invention proceeds upon a radically different theory of forming the product and secures a sheet with brilliant top surface and also one which is as readily cut as is possible with composite articles of this character.

In the accompanying drawings, which make part of this application, 2 is the ordinary casting-table, having the usual racks 3 3 on its longitudinal edges.

4 4 are the hand-wheels, which by pinions 5 5 advance the leading roll 6, which may be either smooth or corrugated, and secondary roll 7. These rolls rest upon trangs 8 8 and preferably one-fourth inch in height and which determine the thickness of the glass, subject to a special provision in the leading roll hereinafter described.

9 9 are the guides, which fix the width of the sheet and are pushed ahead by the rolls.

10 10 are the rods connecting the right and left hand guides.

The mechanism thus far described is old and well known.

11 is a chute for the wire 12, located in advance of the leading roll 6 instead of at the rear of the same, as is common. The leading roll 6 has its ends 13 13 recessed, preferably one-eighth of an inch, so that the body of the roll is left one-eighth of an inch above the bed of the table, while the body of the second roll is one-fourth of an inch above the bed. Obviously these proportional elevations can be obtained in many other ways besides recessing the rolls, and there is no intention to be limited to this precise construction except where specifically claimed. The object had in view is to make the first sheet about one-half the thickness of the resulting product.

The operation of the device is as follows: A ladleful or suitable amount of glass is poured upon the table in advance of the leading roll and the leading roll moved forward. In practice the leading end of the sheet thus formed is discarded as made of chilled glass, and the introduction of the wire is not commenced until about eighteen inches of sheet has been developed. At this point the wire is fed into the hot glass in advance of the leading roller, passes beneath the same, and emerges at the rear side of the leading roll, pressed slightly into the top surface of a sheet one-eighth inch in thickness or pressed more deeply into the body if the leading roll is corrugated. As the forward end of the sheet moves near the rear roller a second casting is made upon the forward or dead end, so that the imperfect ends of the two sheets may coincide, and thus economize material. The rear roller advancing crushes down this second casting and forces the same over the wire-gauze, firmly welding the material in the second casting to the wire-gauze and the first sheet and forming a brilliantly-polished top surface to the product, leaving the wire substantially in the center of the finished sheet, whose thickness will be the height of the rear roller above the bed of the table. The top sheet having only one roller traversing it will not become so chilled as where two or more rollers pass over it and especially where one is a corrugated roll throwing the glass up in ridges.

This invention is distinguished, therefore, from the art as practiced not only by the superior quality of the product, but as well by the following features, either singly or in combination, viz: by the introduction of the wire in advance of the leading roll, by the use of two rollers in place of three or more, by the formation of an original sheet a fraction of the desired thickness with the wire in its top surface, and by the subsequent welding thereto of a top sheet with unbroken surface and by the use of two castings instead of one.

The mechanism for propelling the rollers introducing the wire, means for determining the thicknesses of the sheets of glass, the thickness of the sheets and their widths, as well as other details may be modified while retaining the salient features of the invention. If the leading roll is corrugated, the second roll need not necessarily be in a higher plane above the table than the first roll.

Desiring to correct by reissue the accident and mistake whereby claims constituting the issues of a certain interference and covering broadly the invention common to the patents of Schmertz, No. 791,216 and No. 791,217, and the patent of Leon Appert, No. 608,096, were omitted from the specification of said Patent No. 791,216, what is claimed is—

1. The process of making glass sheets with wire inclosed therein, consisting in simultaneously forming a layer of glass and introducing wire thereto, and completing the sheet by forming another layer upon the first layer of glass, the process being carried on progressively.

2. An apparatus for making sheets of glass with wire inclosed therein, consisting of a table, a leading roll to roll a layer of glass, means to support and introduce wire to the said layer, a second roll, behind the leading roll, to form a layer of glass on the first or underneath layer, the periphery of the second roll being higher above the table than that of the leading roll, and the two rolls being far enough apart to allow the glass for the second or upper layer to be poured between them.

3. In the manufacture of wire-glass, the combination of a table; a leading roll; means for introducing the wire in advance of the leading roll and a second roll whose body is higher from the bed of the table than that of the leading roll.

4. In the manufacture of wire-glass, the combination of a table; a leading roll with recessed ends; means for introducing the wire in advance of the leading roll and a second roll whose body is higher from the bed of the table than that of the leading roll.

5. In the manufacture of wire-glass, the combination of a table; a leading roll; means for introducing the wire in advance of the leading roll and a second roll whose body is substantially twice as high from the level of the casting-table as is the body of the leading roll.

6. An improvement in the process of manufacturing wire-glass which consists in rolling a sheet of glass of less thickness than the ultimate product required; simultaneously forcing wire upon said sheet and forming a second sheet of glass upon said first sheet.

7. An improvement in the process of manufacturing wire-glass which consists in rolling a sheet of glass of about half the ultimate thickness required; simultaneously with the formation of said sheet forcing wire in said sheet and forming a second sheet upon said first sheet.

In testimony whereof THE SCHMERTZ WIRE GLASS COMPANY, assignee, by mesne assignments, of the entire interest in and to the invention set forth in the foregoing specification, has caused its name to be signed hereunto by its president and its seal to be affixed, attested by its secretary, at the city of New York, the 2d day of January, 1906, and RALPH LONGENECKER, administrator of the estate of said EDMUND C. SCHMERTZ, deceased, has hereunto subscribed his name, at Pittsburg, Pennsylvania, the 3d day of January, 1906.

[L. S.] THE SCHMERTZ WIRE GLASS COMPANY,
By LEONARD D. BALDWIN,
*President.*

Attest:

EDWARD T. MAGOFFIN,
*Secretary.*

RALPH LONGENECKER,
*Administrator.*

Witnesses for Leonard D. Baldwin and Edward T. Magoffin:

PHILIP S. HILL,
F. N. BARBER.

Witnesses for Ralph Longenecker:

GEO. J. TAYLOR,
L. M. KING.